United States Patent
Alhadeff et al.

(10) Patent No.: US 8,607,143 B2
(45) Date of Patent: *Dec. 10, 2013

(54) MULTIMEDIA CONTENT VIEWING CONFIRMATION

(75) Inventors: Laurent Daniel Alhadeff, Johannesburg (ZA); Richard Adam Smullen, New York, NY (US)

(73) Assignee: Genesismedia LLC., New York, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/544,233

(22) Filed: Aug. 20, 2009

(65) Prior Publication Data

US 2010/0325544 A1    Dec. 23, 2010

Related U.S. Application Data

(63) Continuation-in-part of application No. 12/485,955, filed on Jun. 17, 2009.

(51) Int. Cl.
*G06F 3/00* (2006.01)
*G06F 3/048* (2013.01)

(52) U.S. Cl.
USPC ........... 715/716; 715/719; 715/835; 715/810; 715/962; 705/14.1; 705/14.4; 705/14.49

(58) Field of Classification Search
USPC ......... 715/700, 703, 716, 719, 733, 764, 765, 715/780, 781, 810, 835, 846, 864, 962; 705/1.1, 14.1, 14.12, 14.4, 14.49; 345/169, 173
See application file for complete search history.

(56) References Cited

U.S. PATENT DOCUMENTS

| | | | |
|---|---|---|---|
| 5,961,333 A * | 10/1999 | Harrison et al. | 434/322 |
| 6,234,802 B1 * | 5/2001 | Pella et al. | 434/156 |
| 2001/0034654 A1 | 10/2001 | Vigil et al. | |
| 2001/0037232 A1 | 11/2001 | Miller | |
| 2002/0132575 A1 | 9/2002 | Kesling et al. | |
| 2004/0152055 A1 | 8/2004 | Gliessner et al. | |
| 2005/0216346 A1 | 9/2005 | Kusumoto et al. | |
| 2006/0129458 A1 | 6/2006 | Maggio | |
| 2006/0224452 A1 | 10/2006 | Ng | |
| 2007/0020604 A1 * | 1/2007 | Chulet | 434/350 |
| 2007/0186252 A1 * | 8/2007 | Maggio | 725/86 |
| 2008/0127249 A1 * | 5/2008 | Cruice | 725/34 |
| 2008/0133346 A1 | 6/2008 | Chow et al. | |
| 2008/0133347 A1 | 6/2008 | Josifovski et al. | |
| 2008/0195460 A1 | 8/2008 | Varghese | |

(Continued)

*Primary Examiner* — Xiomar L Bautista
(74) *Attorney, Agent, or Firm* — Ash Tankha; Lipton, Weinberger & Husick

(57) ABSTRACT

Disclosed herein is a computer implemented method and system for confirming that a viewer viewed multimedia content on a client device. The client device receives the multimedia content from a server and plays the multimedia content on a display screen of the client device. A random challenge is presented to the viewer by overlaying the random challenge on the multimedia content. The random challenge is one or more of random in content, presented at random times during and/or after play of the multimedia content, and presented at random physical locations on the multimedia content. A response for the presented random challenge is invoked from the viewer. The viewer's response confirms that the multimedia content has been viewed by the viewer. A response report is generated based on the viewer's response. The viewer is credited with an item of value, if the response report confirms the multimedia content was viewed by the viewer.

25 Claims, 24 Drawing Sheets

(56) References Cited

U.S. PATENT DOCUMENTS

| | | |
|---|---|---|
| 2008/0221986 A1 | 9/2008 | Soicher et al. |
| 2008/0286739 A1* | 11/2008 | Umrigar et al. ............... 434/323 |
| 2008/0306946 A1 | 12/2008 | Wu |
| 2008/0307066 A1 | 12/2008 | Amidon et al. |
| 2009/0012855 A1 | 1/2009 | Jamal et al. |
| 2009/0055938 A1* | 2/2009 | Samuel ........................... 726/30 |
| 2010/0162289 A1* | 6/2010 | Sanders .......................... 725/23 |
| 2011/0191174 A1* | 8/2011 | Ibenforth et al. .......... 705/14.49 |

* cited by examiner

```
#include <iostream>
#include "bzChallengeGenerator.h"

using namespace std;

int main(int argc, char* argv[])
{
        bzChallengeGenerator generator;
        generator.ContentType(bzChallengeGenerator::NUMBERS);  // use
        numbers
        generator.ContentDisplaySize(20); // number will be displayed in a 20x20
        pixel square generator.VideoDisplayHeight(240); // video frame height is 240 pixels
        generator.VideoDisplayWidth(320); // video frame width is 320 pixels
        generator.VideoDuration(30); // video playing time is 30 secs bzChallenge c;
        int begin;
        begin = 0;
        cout << "Let's see how many we can randomly generate in sequence" <<
        endl;
        do
        {
                c = generator.Generate(begin);
                cout << c << endl;
                begin = c.Offset() + c.Duration();
        }
        while (begin <= (int)(generator.VideoDuration() -
bzChallengeGenerator::s_contentDuration));
        cout << "Let's generate a challenge for each 10 sec segment" << endl;
        cout << generator.Generate(0, 10) << endl;
        cout << generator.Generate(10, 20) << endl;
        cout << generator.Generate(20, 30) << endl;
        cout << endl << "Press RETURN to continue...";
        char x;
        cin.get(&x, 1);
        return 0;
}
```

FIG. 12A

```
#include <time.h>
#include "bzChallengeGenerator.h"

const char* bzChallengeGenerator::s_content[] =
{
        "0123456789",
        "ABCDEFGHJKLMNPQRTUVWXYZ",  // letters resembling numbers omitted: I O S
        "!@#$%^&*+-"
};
bzChallengeGenerator::bzChallengeGenerator(void)
{
        assert(s_contentDuration > 0);

m_contentType = NUMBERS;
        m_contentDisplaySize = 0;

m_videoDisplayWidth = 0;
        m_videoDisplayHeight = 0;
        m_videoDuration = 0;

// seed the rand() random number generator using the time
        time_t t;
        time(&t);
        srand((int)t);
}
bzChallengeGenerator::~bzChallengeGenerator(void)
{
}
```

FIG. 12B

```
bzChallenge bzChallengeGenerator::Generate(int begin, int end) const
{       begin = (begin < 0) ? 0 : begin;
        assert(begin <= (int)m_videoDuration);
        end = (end < 0) ? m_videoDuration : end;
        assert(end <= (int)m_videoDuration);
        int duration = end - begin;
        // validate parameters
        assert(duration >= s_contentDuration);
        assert(m_videoDisplayWidth >= m_contentDisplaySize);
        assert(m_videoDisplayHeight >= m_contentDisplaySize);
        bzChallenge c;
        int contentLen = strlen(s_content[m_contentType]);
        assert(contentLen > 0);
        // randomly select a character within the content type array
        c.m_content = s_content[m_contentType][RangedRand(0, contentLen - 1)];
        // randomly select an offset between begin and end, allowing time to display
the content
        c.m_offset = RangedRand(begin, end - s_contentDuration);
        // save the duration
        c.m_duration = s_contentDuration;
        // randomly select a horizontal position along the video width allowing space
to display the content
        c.m_xPosition = RangedRand(0, m_videoDisplayWidth -
m_contentDisplaySize);
        // randomly select a vertical position along the video width allowing space to
display the content
        c.m_yPosition = RangedRand(0, m_videoDisplayHeight -
m_contentDisplaySize);;
        return c;
}
int bzChallengeGenerator::RangedRand(int from, int to)
{
        return rand() % (to - from + 1) + from;
}
```

FIG. 12C

```
pragma once
#include <assert.h>
#include "bzChallenge.h"
class bzChallengeGenerator
{
public:
        bzChallengeGenerator(void);
        ~bzChallengeGenerator(void);

enum ContentTypeEnum // type of characters to display
        {
                NUMBERS = 0,
                LETTERS = 1,
                SYMBOLS = 2
        };
        // constant duration to display character during challenge (secs)
        static const unsigned int s_contentDuration = 3;

ContentTypeEnum ContentType() const { return m_contentType; }
        void ContentType(ContentTypeEnum c) { m_contentType = c; } unsigned int ContentDisplaySize() const { return m_contentDisplaySize; }
        void ContentDisplaySize(unsigned int n) { assert(n > 0); m_contentDisplaySize = n; } unsigned int VideoDisplayWidth() const { return m_videoDisplayWidth; }
        void VideoDisplayWidth(unsigned int n) { assert(n > 0); m_videoDisplayWidth = n; } unsigned int VideoDisplayHeight() const { return m_videoDisplayHeight; }
        void VideoDisplayHeight(unsigned int n) { assert(n > 0); m_videoDisplayHeight = n; } unsigned int VideoDuration() const { return m_videoDuration; }
        void VideoDuration(unsigned int n) { assert(n > 0); m_videoDuration = n; }
        // this static method returns a random integer in the close interval [from, to]
        static int RangedRand(int from, int to);
```

FIG. 12D

```
        // this method generates a random challenge given the properties specified
        bzChallenge Generate(int begin = -1, int end = -1) const;
private:
        // content type arrays
        static const char* s_content[];

// type of content to select character from
        ContentTypeEnum m_contentType; // type of characters to display in video
as challenge
        // character display area to be overlaid on image; square in pixels
        unsigned int m_contentDisplaySize; // display area (square) within video
frame to display char, in pixels
        // width of video display area
        unsigned int m_videoDisplayWidth;
        // height of video display area
        unsigned int m_videoDisplayHeight;
        // video's playing time
        unsigned int m_videoDuration;
};
```

FIG. 12E

```
#include "bzChallenge.h"

using namespace std;

std::ostream& operator<<(std::ostream& os, const bzChallenge& c)
{
        os << "Display '" << c.Content() << "' at offset " << c.Offset() << " secs for " << c.Duration() << " secs ";
        os << "at location (" << c.XPosition() << ", " << c.YPosition() << ")";

return os;
} bzChallenge::bzChallenge(void)
{
        m_content = 0;
        m_contentDisplaySize = 0;
        m_offset = 0;
        m_duration = 0;
        m_xPosition = 0;
        m_yPosition = 0;
} bzChallenge::~bzChallenge(void)
{
}
```

FIG. 12F

```
pragma once include <iostream>
//
// This class represents the challenge result returned by the Challenge Generator
//
class bzChallenge
{
friend class bzChallengeGenerator; // only this class can poke values public:
        bzChallenge(void);
        ~bzChallenge(void);

char Content() const { return m_content; }
        unsigned int Offset() const { return m_offset; }
        unsigned int ContentDisplaySize() const { return m_contentDisplaySize;
}
        unsigned int Duration() const { return m_duration; }
        unsigned int XPosition() const { return m_xPosition; }
        unsigned int YPosition() const { return m_yPosition; } private:
        char m_content;  // content character to display
        unsigned int m_contentDisplaySize; // char display area in pixels
(square)
        unsigned int m_offset; // offset in secs into video when to display
        unsigned int m_duration;  // how long to display char
        unsigned int m_xPosition; // pixel position along width
        unsigned int m_yPosition; // pixel position along height
};

std::ostream& operator<<(std::ostream& os, const bzChallenge& c);
```

FIG. 12G

RUN #1

LET'S SEE HOW MANY WE CAN RANDOMLY GENERATE IN SEQUENCE
DISPLAY "3" AT OFFSET 19 SECS FOR 3 SECS AT LOCATION (233, 8)
DISPLAY "2" AT OFFSET 26 SECS FOR 3 SECS AT LOCATION (29, 134)
LET'S GENERATE A CHALLENGE FOR EACH 10 SEC SEGMENT
DISPLAY "7" AT OFFSET 0 SECS FOR 3 SECS AT LOCATION (89, 16)
DISPLAY "2" AT OFFSET 15 SECS FOR 3 SECS AT LOCATION (58, 171)
DISPLAY "9" AT OFFSET 26 SECS FOR 3 SECS AT LOCATION (151, 109)

RUN #2

LET'S SEE HOW MANY WE CAN RANDOMLY GENERATE IN SEQUENCE
DISPLAY "6" AT OFFSET 10 SECS FOR 3 SECS AT LOCATION (60, 90)
DISPLAY "5" AT OFFSET 21 SECS FOR 3 SECS AT LOCATION (108, 116)
DISPLAY "3" AT OFFSET 26 SECS FOR 3 SECS AT LOCATION (274, 215)
LET'S GENERATE A CHALLENGE FOR EACH 10 SEC SEGMENT
DISPLAY "5" AT OFFSET 6 SECS FOR 3 SECS AT LOCATION (36, 119)
DISPLAY "6" AT OFFSET 10 SECS FOR 3 SECS AT LOCATION (150, 220)
DISPLAY "1" AT OFFSET 20 SECS FOR 3 SECS AT LOCATION (11, 43)

FIG. 13 ial U.S. patent application Ser. No. 12/485,955, titled
MULTIMEDIA CONTENT VIEWING CONFIRMATION

CROSS REFERENCE TO RELATED APPLICATIONS

This is a continuation in part application of non-provisional U.S. patent application Ser. No. 12/485,955, titled "Multimedia Content Viewing Confirmation" filed on Jun. 17, 2009 in the United States Patent and Trademark Office.

This application also claims the benefit of the following patent applications:
1. Provisional patent application No. 61/094,094 titled "An Audiovisual Material Supply System and Method", filed on Sep. 4, 2008 in the United States Patent and Trademark Office.
2. Provisional patent application No. 61/108,071, titled "An Audio Visual Matter Supply System and Method", filed on Oct. 24, 2008 in the United States Patent and Trademark Office.
3. Provisional patent application No. 61/117,668, titled "An Audiovisual Material Supply System And Method", filed on Nov. 25, 2008 in the United States Patent and Trademark Office.
4. Provisional patent application No. 61/162,393, titled "An Audiovisual Material Supply System and Method", filed on Mar. 23, 2009 in the United States Patent and Trademark Office.

The specification of the above five referenced applications are herein incorporated in the present non-provisional application in their entirety.

BACKGROUND

The computer implemented method and system disclosed herein, in general, relates to a viewer response system. More particularly, the computer implemented method and system disclosed herein relates to supplying multimedia content to a client device of a viewer and confirming that the entire multimedia content has been viewed by the viewer.

Media service providers can reach viewers of their media services through a wide spectrum of technologies and devices such as general packet radio service (GPRS), 3G or other internet enabled cellular phones, computers with connection to the internet, and televisions with digital set top boxes. Using this outreach, media service providers earn revenue from product and service companies seeking to advertise their products and services through the media services. However, the efforts of the media service providers to advertise products and services may not achieve optimum results as the viewers may not view or may not be interested in viewing the multimedia content, for example, a video of the advertised products or services. This in turn reduces the outreach of companies seeking to advertise their products and services to potential customers through media services, and may lead to reduced revenue for both the companies that advertise their services through the media service providers, and for the media service providers. Also, product and service companies can not confirm whether the viewers viewed the advertisements, since the advertisements are delivered to remote devices. Current viewer measurement systems only provide passive viewer measurement based on whether the advertisement is played on the devices or not, but not based on whether the viewers have attentively viewed the advertisement.

Therefore, there is a need for a computer implemented method and system that enables the media service providers to confirm that a viewer viewed multimedia content such as advertisements on a client device, and encourages the viewer to provide the confirmation that in turn reflects the interest of the viewer in the advertisements.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for confirming that a viewer viewed the entire multimedia content on a client device, and for providing an incentive to the viewer to view the entire multimedia content. The computer implemented method and system can generally be used for confirming that a viewer viewed the entire multimedia content that is, for example, commercial, educational, and entertaining in nature.

In the computer implemented method and system disclosed herein, viewing of the multimedia content is confirmed using a challenge-response mechanism. A multimedia content owner, for example, an advertiser, uploads multimedia content on a server of a media service provider. The client device of a viewer receives the multimedia content, for example, an advertisement, a commercial message, an educational clip, an entertainment clip, etc., from the server and plays the multimedia content on a display screen of the client device, for example, in an audiovisual format. As used herein, the client device is, for example, an internet-enabled mobile device, a computer with a web browser, a set top box capable of delivering interactive multimedia content, etc. The client device is capable of receiving the multimedia content in different multimedia content formats, for example, Windows® audio video format and other proprietary formats.

A random challenge is presented to the viewer by overlaying the random challenge on the multimedia content. The random challenge is one or more of random in content, presented at random times during and/or after the play of the multimedia content, and presented at random physical locations on the multimedia content. The random challenge comprises, for example, one or more of a random number, a random icon, a random shape, a product logo, a service logo, a random color, a random mathematical equation, and a random target on the display screen of the client device for the viewer to interact therewith using touch or a pointing device. In an embodiment, the random challenge content is unrelated to the multimedia content. The random challenge changes for each multimedia content viewing. The random challenge is presented at one or more times during and/or after the multimedia content is played. The duration of play of the multimedia content is determined and the random challenge is presented during and/or after the play duration of the multimedia content.

One or more responses are invoked from the viewer for one or more presented random challenges. If one or more of the responses entered by the viewer for the presented one or more random challenges is correct, the response confirms that the multimedia content has been viewed by the viewer. The presentation of the random challenge to the viewer may be repeated if the response from the viewer to the presented random challenge is incorrect. A response report is generated based on the response from the viewer. The generated response report is transmitted to the server for confirming that the multimedia content has been viewed.

In an embodiment, the random challenge is presented by interrupting the play of the multimedia content after an interrupt time period. The interrupt time period is less than duration of the multimedia content. A timer is provided to begin counting the interrupt time period at the start of the play of the multimedia content. When the timer reaches the interrupt time period, the play of the multimedia content is interrupted to present the random challenge to the viewer.

The random challenge is presented in different forms such as a visual overlay on the multimedia content, or a child window cascading with the content rendering window, or parent window. For example, the random challenge comprises one or more random numbers presented at different points in time when the multimedia content is being played. The correct response in this example comprises reproduction of the random numbers by entering the random numbers into the client device. In an embodiment, the random challenge comprises, for example, a random pair of geometrical shapes, a random mathematical equation, a random icon, a product logo or a service logo, a color, a target on a touch screen, etc, overlaid at random physical positions on the multimedia content. The correct response may comprise a selection of an option representing a pair of geometrical shapes from an options list, entering the result of the mathematical equation into the client device, selection of an option representing an icon from an options list, selection of an option representing a product logo or a service logo from an options list, selection of an option representing a color from an options list, selection of or interaction with a target or response region on a touch screen, etc. respectively. In another embodiment, one or more random challenges are presented at different time intervals during the play of the multimedia content or at the conclusion of the play of the multimedia content.

The random challenge appears randomly on a multimedia player frame within the display screen of the client device. For example, the random challenge appears randomly on any four corners of the multimedia player frame. The random challenge also appears at a number of unique positions within the multimedia player frame based on physical coordinates selected within the multimedia player frame. The random challenge may also appear immediately outside a boundary of the multimedia player frame and scrolls in an upward direction or a downward direction on either side of the multimedia player frame. The random challenge also scrolls in a rightward direction or a leftward direction above or below the multimedia player frame.

A response for a random challenge is deemed correct, i.e., viewing of the multimedia content is confirmed if the viewer provides the response within a response time-out period after the random challenge is presented. For example, a timer is provided to determine the time lapsed between the presentation of the random challenge and the submission of the response on the client device.

The response for a random challenge is invoked at any time during and/or after the multimedia content is played. For example, the viewer may be prompted to enter a response to the random challenge during the play of the multimedia content, or during and also at the end of the play of the multimedia content, or after the multimedia content is played.

In an embodiment, the client device downloads the multimedia content when the client device is connected to the server. In this embodiment, when the connection to the server is inactive, the client device renders the downloaded multimedia content in an off-line mode, performs a challenge-response interaction with the viewer, and generates and stores the response report. The off-line mode is triggered when the connection to the server is inactive. When a connection to the server is established via, for example, satellite, the network, etc., the response report is transmitted to the server over the connection. In another embodiment, the client device renders the multimedia content transmitted by the server as streaming multimedia content. In this embodiment, when the connection to the server is active, the client device renders the multimedia content in an online mode and performs a challenge-response interaction with the viewer. The response report generated after completing the challenge-response interaction is transmitted to the server over the active connection.

In an embodiment, the viewer is credited with an item of value, for example, cash, if the response report confirms the multimedia content was viewed by the viewer, and the multimedia content owner is debited a fee. When the viewer successfully responds to one or more of the random challenges, the correct or partially correct response to the random challenge indicates a confirmation that the multimedia content has been viewed. In an embodiment, the viewer is eligible for an item of value even when one or more responses entered by the viewer are incorrect. In an embodiment, the viewer is eligible for an item of value for each correct response to a random challenge presented. Offering an item of value for a confirmed view provides an incentive to the viewer to view the entire multimedia content and answer the random challenge presented during or after the play of the multimedia content. In another embodiment, the incentive is in the form of a redeemable credit score accumulated by the viewer over time. The credit score is redeemed, for example, with money, gifts, or any other item of value. The server is configured to receive the response report sent by the client device, and directs a payment module to credit an account of the viewer, for example, with a predetermined amount of money for a confirmed viewing of the multimedia content. In an embodiment, the response report is generated at the server.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 12A-12G exemplarily illustrate a C++ implementation of a challenge generator.

FIG. 13 exemplarily illustrates a sample output after executing test cases established for the challenge generator.

DETAILED DESCRIPTION OF THE INVENTION

Figure 1:
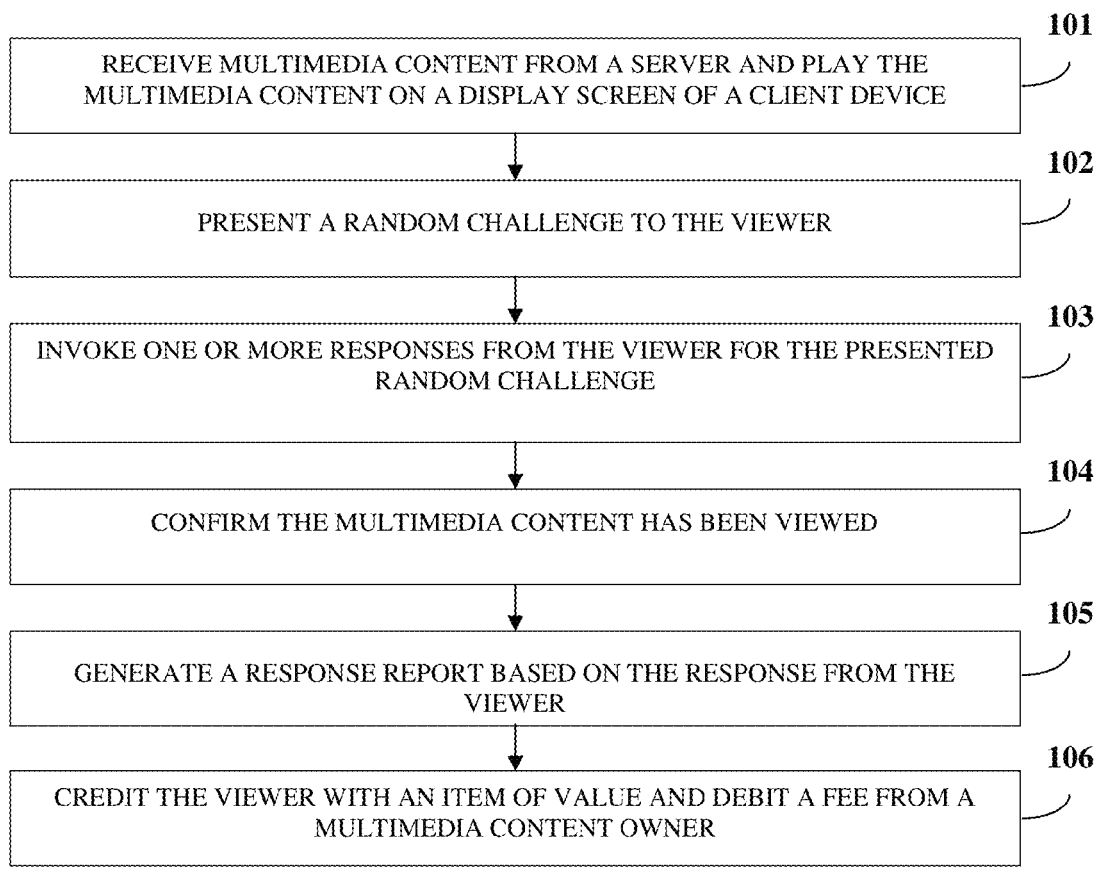
FIG. 1 illustrates a first embodiment of a computer implemented method for confirming that a viewer viewed multimedia content on a client device.

FIG. 1 illustrates a first embodiment of a computer implemented method for confirming that a viewer viewed multimedia content on a client device 301. As used herein, the term "multimedia content" refers to different combined and individual formats of content, such as, text, audio, video, audiovisual, still images, animations, and rich content formats. The computer implemented method and system disclosed herein is used for promoting the viewing of multimedia content, for example, an advertisement clip of a product by providing an incentive to the viewer to view the multimedia content. The method and system can be used, in general, for confirming that the viewer has viewed the multimedia content that is commercial, educational, and entertaining in nature.

In the computer implemented method disclosed herein, viewing of the multimedia content is confirmed using a challenge-response mechanism. The challenge-response is incorporated within the multimedia content available for consumption by the viewer on a client device 301 capable of connecting to a network 303 and capable of rendering multimedia content formats.

Figure 3:
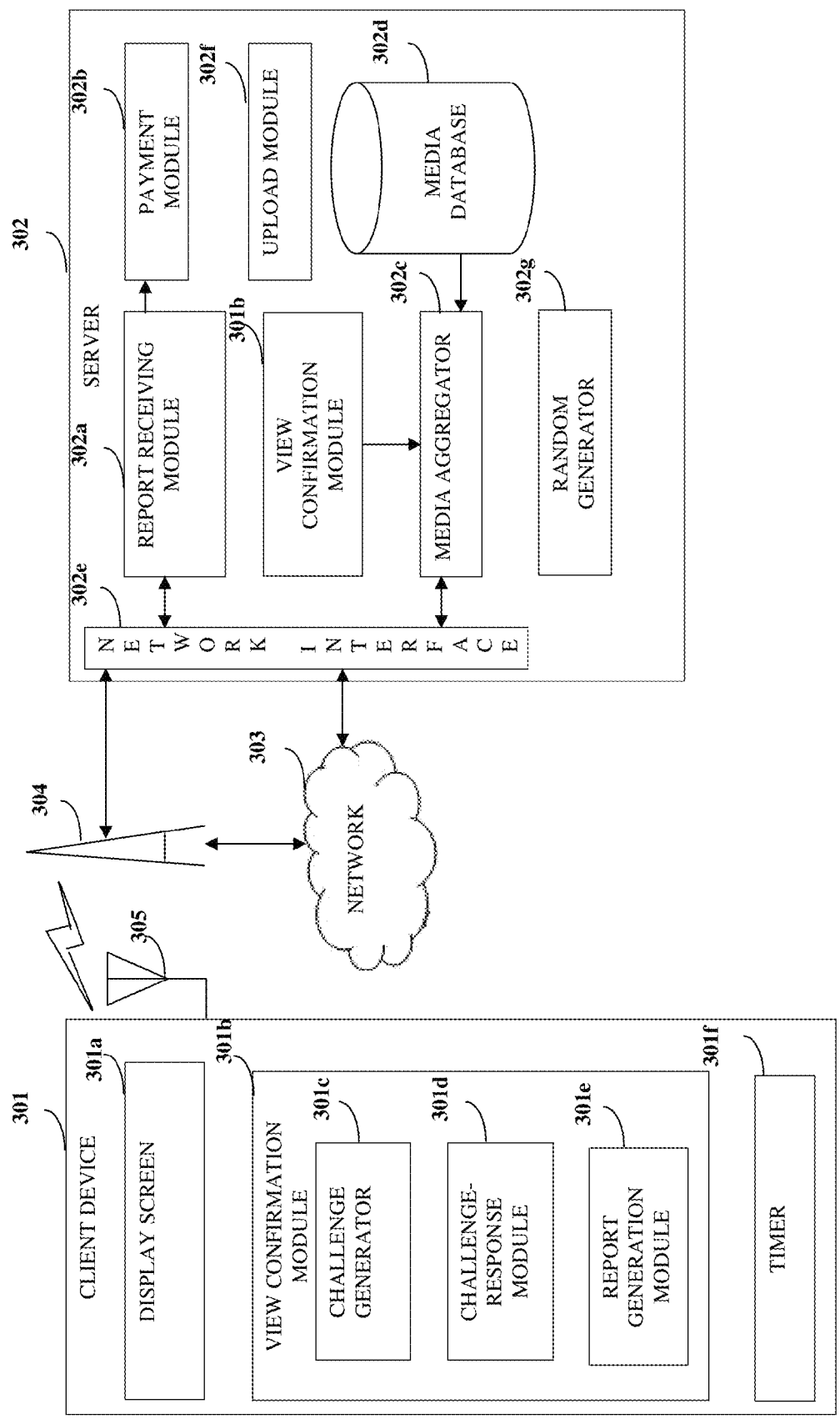
FIG. 3 illustrates a computer implemented system for confirming that a viewer viewed multimedia content on a client device.

The client device 301 possessed by the viewer is capable of establishing a client-server relationship with a server 302 via a network 303 as illustrated in FIG. 3. The client device 301 may also download a client software module, for example, a view confirmation module 301b over the network 303 for making service requests to the server 302, while the server 302 addresses the service requests. The network 303 is, for example, a cellular network, the internet, a local area network, or any other network established using available networking protocols.

A multimedia content owner, for example, an advertiser, uploads multimedia content, for example, an advertisement, a commercial message, an educational clip, an entertainment clip, etc. on a server 302 of a media service provider. As used herein, "multimedia content owner" refers to an entity that generates multimedia content. Also, as used herein, "media service provider" refers to a service entity that provides the service of confirming that a viewer has viewed multimedia content uploaded by the multimedia content owner on the server 302. The client device 301 of a viewer receives 101 the multimedia content from the server 302 and plays the multimedia content on a display screen 301a of the client device 301, for example, in an audiovisual format. As used herein, the client device 301 refers to, for example, an internet-enabled mobile device, a computer with a web browser, and a set top box capable of delivering interactive multimedia content, etc. The client device 301 is capable of receiving the multimedia content in different multimedia content formats, for example, Windows® audio video format, and other proprietary formats. A random challenge is presented 102 to the viewer by overlaying the random challenge on the multimedia content. The random challenge comprises, for example, one or more of a random number, a random icon, a random shape, a product logo, a service logo, a random color, a random mathematical equation, and a random target on the display screen 301a of the client device 301 for the viewer to interact therewith using touch or a pointing device. The random challenge is overlaid at different positions on the multimedia content. The random challenge is overlaid using technologies, for example, Adobe® Flash or other video creation standards. The streams comprising the random challenge and the multimedia content are integrated at either the server level or combined at a web browser on the client device 301 of the viewer. The random challenge and the multimedia content may arrive at the client device 301 of the viewer as a single integrated stream or as two independent streams that are combined in real time at the client device 301.

The content of the random challenge is, for example, numbers, letters, shapes, phrases, etc., from a predefined set. The random challenge is one or more of random in content, presented at random times during and/or after play of the multimedia content, and presented at random physical locations on the multimedia content. In an embodiment, the random challenge content is unrelated to the multimedia content.

In an embodiment, the challenge is a pseudorandom challenge. A pseudorandom challenge involves the random selection of a limited set of challenge icons from a fixed data set, displayed at random times with certain defined boundaries, and at random physical placements within a display screen 301a. For example, the pseudorandom challenge involves a random selection of a number between 0-9; a random selection of a shape among, for example, a circle, square, triangle; a random selection of a letter within the alphabet, etc. Furthermore, the pseudorandom challenge comprises random placement of the randomly selected content, both in terms of time and space within the multimedia content. The pseudorandom placement of the challenge can define time boundaries. For example, a first challenge occurs between second "X" and second "Y" of the multimedia selected for play, while a second challenge occurs within 10 seconds of the end of the play. The two-dimensional space defined by the display screen 301a within which the challenge occurs can also be pseudorandom within fixed parameters. For example, the pseudorandom challenge appears in one of the four corners of the display screen 301a, each time a pseudorandom challenge is displayed, at a pseudorandom time.

In an embodiment, the randomness of the challenge content for space is implemented as follows. The placement of the challenge is made random by overlaying the challenge content at different locations in or around the multimedia content. The purpose of randomizing the placement of the challenge content is to prevent, for example, "ad blindness". "Ad blindness" as used herein results when the viewer focuses on a single physical spot within a multimedia player frame 1002. As used herein, the multimedia player frame 1002 is a graphical output component of any media player application that plays the multimedia content in a defined region within the display screen 301a of the client device 301 as exemplarily illustrated in FIG. 10. The random challenge appears randomly on the multimedia player frame 1002 within the display screen 301a of the client device 301. In an example, a challenge icon flashes randomly within one of the four corners of the multimedia player frame 1002 when a video is played. The viewer is encouraged to watch the entire video and not focus solely on a single physical spot within the video, since the location of the challenge icon is random. This allows the viewer to more completely view the content of the video to absorb the content of the video being played amidst the challenge-response interaction.

Figure 10:
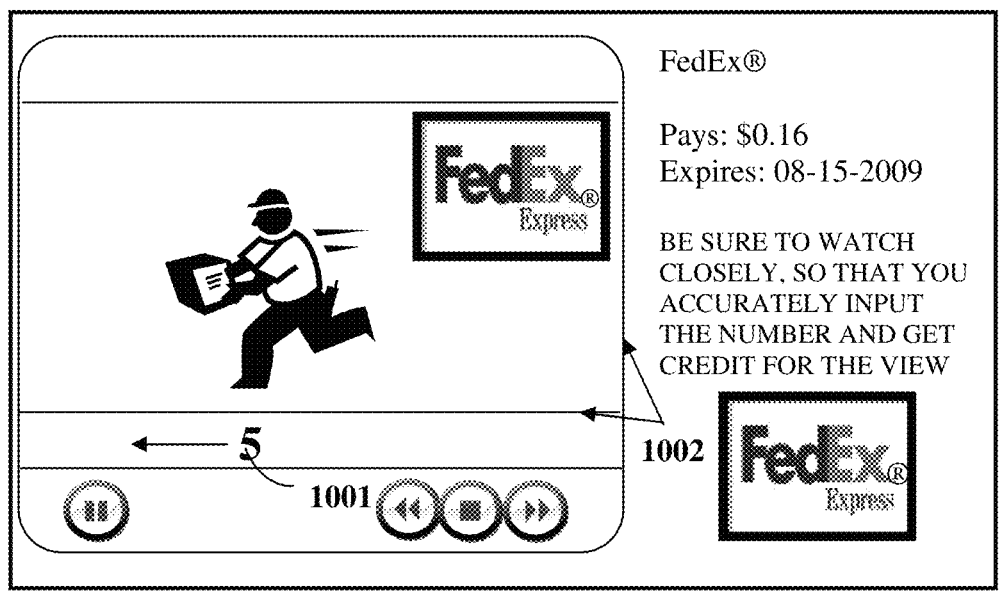
FIG. 10 exemplarily illustrates a screen shot for a scrolling random challenge.

In another example, the random challenge appears immediately outside a boundary of the multimedia player frame 1002. The challenge icon, for example, scrolls in an upward direction or a downward direction on either side of the video immediately outside the boundary of the actual multimedia player frame 1002, or scrolls in a rightward direction or a leftward direction of the multimedia player frame 1002 in a region above or below the video, as exemplarily illustrated in FIG. 10. FIG. 10 exemplarily illustrates a screen shot for a scrolling random challenge icon, for example, the numeral "5" 1001 moving in a leftward direction below the video. The direction in which the challenge icon scrolls as well as the position of the challenge icon relative to the multimedia player frame 1002 are random. For example, the challenge icon scrolls vertically up or vertically down in a region immediately left of the multimedia player frame 1002. In another example, the challenge icon scrolls horizontally right or left in a region immediately above the multimedia player frame 1002. The viewer is therefore required to watch the entire multimedia player frame 1002 in order to respond to the challenge icon. In another embodiment, the challenge icon scrolls diagonally within the multimedia player frame 1002 from one corner to the other.

In another example, the challenge icon is randomly displayed at any location within the multimedia player frame 1002. Physical coordinates, for example, X and Y coordinates for display of the challenge icon within the multimedia player frame 1002 are randomly selected by a challenge generator 301c. In this manner, the challenge icon can appear at a number of unique positions in a multimedia player frame 1002 depending on the possible combinations of the X and Y coordinates selected within the multimedia player frame 1002.

In an embodiment, the client device 301 receives a list of multimedia content from the server 302 for selection by the viewer. The multimedia content selected by the viewer is rendered on the display screen 301a of the client device 301, and the duration of play of the selected multimedia content is determined. A random challenge is presented at one or more points in time by overlaying the random challenge on the rendered multimedia content. For example, the random challenge is presented for N seconds, after L seconds elapse with an audio-video clip of duration M seconds, wherein L is less than M. The random challenge is presented at one or more times during and/or after the multimedia content is played. The random challenge changes for each multimedia content viewing.

One or more responses are invoked 103 from the viewer for the presented random challenge. A response may be invoked from the viewer during or at the end of play of the multimedia content. If the viewer enters the response to the presented random challenge, the response confirms 104 that the multimedia content has been viewed by the viewer. The viewer may enter a response to the random challenge during the play of the multimedia content, and optionally during and after the multimedia play, and optionally after the multimedia play. A response report is generated 105 based on the response from the viewer. The generated response report is transmitted to the server 302 confirming that the multimedia content has been viewed by the viewer. In an embodiment, the response report is generated on the server 302.

In an embodiment, the presentation of the random challenge to the viewer is repeated if the response from the viewer for the presented random challenge is incorrect. The steps of rendering the viewer selected multimedia content, presenting a random challenge, invoking a response, and generating a response report may be repeated for other multimedia content in the list depending on the selection of the viewer.

The random challenge is presented in different forms, for example, a visual overlay on the multimedia content, or a child window cascading with the content rendering window. For example, the random challenge is presented as a graphical user interface (GUI) widget. In another example, the random challenge is a short audio message introduced briefly into the visual-only media content. The randomness in the challenges is due to the randomness in visual elements presented in the challenges as well as the responses that the challenges elicit during or after the multimedia content is played. For example, the random challenge comprises one or more random numbers flashed at different points in time when a multimedia content is being played. The correct response in this example comprises reproduction of the random numbers by entering the random numbers into the client device 301. The response is verified by comparing the numbers entered by the viewer with the numbers flashed in the multimedia content. The random challenge further comprises, for example, one or more random geometrical shapes presented at different points in time, a random mathematical equation, a random icon, a product logo or a service logo, a color, a target on a touch-sensitive screen that the viewer has to touch, a target that is pointed at by a pointing device, etc. In these examples, the correct response comprises a selection of an option representing the geometrical shapes from an options list, entering the result of the mathematical equation into the client device 301, selection of an option representing an icon from an options list, selection of an option representing a product logo or a service logo from an options list, selection of an option representing different colors from an option list, selection or interaction with the target on a touch-sensitive screen, etc., respectively.

In an embodiment, one or more random challenges are presented at one or more times or at different time periods, during or after the multimedia content is played. For example, the first challenge is presented half way through the play of a multimedia clip and the second challenge is presented at the end of the multimedia clip.

The viewer is requested to provide a response to the random challenge on the client device 301 within a predetermined period of time after the random challenge is presented. A response for a random challenge is deemed valid if the viewer provides the correct response within a response timeout period after the random challenge is presented. A timer 301f is provided to determine the time lapsed between the presentation of the random challenge and the submission of the response.

In an embodiment, the viewer is credited 106 with an item of value, for example, cash, if the response report confirms the multimedia content has been viewed by the viewer, while the multimedia content owner is debited a fee for the service provided to the multimedia content owner by the media service provider of the multimedia content. When the viewer's response to the random challenge is correct or partially correct where more than one random challenge is presented to the viewer, the correct response to the random challenge confirms that the multimedia content was viewed. In an embodiment, the viewer is optionally eligible for an item of value even when one or more responses entered by the viewer are incorrect. In an embodiment, where the number of random challenges presented is more than one, the viewer is eligible for an item of value for each correct response.

Compensating the multimedia content viewer with an item of value for a confirmed view provides an incentive to the viewer to view the entire multimedia content and answer the random challenge that is presented during or after the play of the multimedia content. In an embodiment, the incentive is in the form of a redeemable credit score accumulated by the viewer over time. For example, offering an incentive to answer the random challenge presented within an advertisement clip generates interest in a potential buyer to view the entire advertisement clip, thereby promoting the service or product advertised in the multimedia content. In an embodiment, the incentive is in the form of a redeemable credit score accumulated by the viewer over time. The credit score is redeemed with, for example, money, gifts, or any other items. The server 302 is configured to receive the response report sent by the client device 301, and directs a payment module 302b to credit an account of the viewer with an item of value, for example, a predetermined amount of money for the confirmed view. In an embodiment, the response report is generated at the server 302.

The response for a random challenge is invoked at any random point in time during or after the multimedia content is played. For example, the viewer is prompted to enter a response to the random challenge at the end of the duration of the multimedia content. The random challenge may appear once or multiple times when the multimedia content is played on the viewer's client device 301. The viewer may be prompted to answer the random challenge either during or immediately following the completion of the multimedia content. In an example, the multimedia content is an audio-video file with a duration of 20 seconds. During the playing of the video, the numerals 7 and 9 are each flashed for 2 seconds, for example, at the $10^{th}$ and $15^{th}$ second respectively, after the start of the play of the video for the observation of the viewer. At the completion of the audio-video file, an answer box appears prompting the viewer to enter the numbers flashed during the audio-video, in order to register a correct response and therefore a confirmation of the view.

In another example, a video is played to the viewer, during which a pair of geometrical shapes, for example, a circle followed by a square appear in subsequent frames of the video. The geometrical shapes are overlaid at random positions on the video and appear independent of the video, or appear as part of the video. At the completion of the video, a pull down answer menu appears with several shape pairs as options. The viewer selects the correct shape pairs from the options in the menu to register a correct response. In another example, a video is played in the primary window of the user interface and a child window appears either cascaded with or alongside the parent window. The companion window displays a mathematical equation, such as (3+3=?), as the challenge. The video is paused momentarily, or for a response time-out period within which the viewer is required to enter the correct answer, in this case 6. In an embodiment, the viewer is required to submit the correct response in order to resume playing of the video, or avoid termination of the video. In another example, a color is flashed in the foreground or the background when the video clip is being played. The viewer is required to either enter a description of the color or select the color from an options list to register a correct response.

In an embodiment, the random challenge comprises a target or a response region that appears on a touch-sensitive screen of, for example, an iPhone of Apple Inc. or other touch-sensitive internet connected devices. The target or the response region appears on the touch-sensitive screen during the playing of a video. As used herein, the target or the response region is a viewer selectable area, randomly overlaid during the play of the multimedia content, with which the viewer interacts within a response time out period to register a valid response. The response is invoked in real-time and involves the viewer, for example, touching a region on the touch-sensitive screen where the target or the response region appears. For example, a commercial on baseball is displayed on the touch-sensitive screen. During the play of the commercial, various baseball team logos are randomly displayed, each for 2 to 3 seconds. The viewer can confirm viewing of the commercial by touching the touch-sensitive screen when and where the logos appear. In an embodiment, the challenge and response interactions are implemented using GUI widgets. The challenge presented to the viewer is to pinpoint a position on the parent window where a child window, such as modal window, appears at a random position during the playing of the video in the parent window. A modal window is a child window that requires the viewer to interact with the child window before the viewer can return to the flow of the parent window. The challenge further comprises selecting the pinpointed position within a response time-out period. The selection of the pinpointed position is performed, for example, using a touch stylus on a touch-sensitive screen, or using a pointing device and a corresponding pointer on the display screen 301a. In this example, the user interface is a touch-sensitive screen or a pointing device in conjunction with a regular screen, respectively. The child window presenting the challenge may comprise a button that has to be selected by the viewer within the response time-out period to register a valid response.

In another example, the viewer is required to complete more than one challenge-response interaction, that is, locate and select more than one random target or response region at different time periods, during the play of a video. For example, during the playing of a video in the parent window, a first button appears for 5 seconds at half-way through the video, while a second button appears for 5 seconds at the end of the video. The viewer is required to locate and select both the buttons within the relevant response time-out periods to register a valid response. If the viewer has not correctly selected either of the targets or both the targets within the relevant response time-out periods, the viewer is prompted to replay the video and complete the challenge. In another example, the targets or the response regions, for example, one or more buttons appear immediately outside the boundary of the multimedia player frame 1002, during the play of a video. The viewer is required to locate and select the buttons within the relevant response time-out periods to register a valid response.

In an embodiment, the random challenge content is either visual or aural. In the latter case, the random challenge content is in a non visual alphanumeric form. If the random challenge content is aural in nature, the random challenge content is, for example, alphanumeric or indicative of a logo, icon, symbol, shape, picture, etc. If the random challenge content is visual, the random challenge content is, for example, in the form of a logo, icon, symbol, shape, picture, etc. The response for the random challenge requires the viewer to enter the random challenge content, or to select the correct option from the presented options. The response is also manually or orally registered. For example, the viewer has to perform a manual action such as depressing a button, operating a pointing device or touching a screen, or utter words or sounds to register a response.

Consider an example where the challenge content is visually presented to the viewer. The challenge content, such as, a logo, an icon, a symbol, a shape, a picture, etc. is displayed for 5 seconds within a first child window during the play of an advertisement in a parent window or content rendering window. A second child window displays a message or a prompt such as "Provide the symbol above at the end of the advertisement" or "Select the symbol previously displayed". Consider another example where the challenge content is aurally presented to the viewer during the play of an advertisement. A speech synthesizer provides an audible sound indicative of the challenge content, and also prompts the viewer to remember and submit the challenge content at the end of the advertisement, for example, "Enter the two digits that you heard". The viewer submits the response by selecting the correct option indicative of the challenge content presented. The viewer also submits the response by depressing the appropriate alphanumeric keys of the input means of the client device 301. In another example, the viewer submits the response by uttering or orally articulating the challenge content, which is processed by suitable voice recognition software in the client device 301 or the server 302. In an embodiment, the viewer is required to submit the correct response within a time-out period.

In the event that the viewer enters an incorrect response, or enters the response after the elapse of the response time-out period, the challenge-response module 301d displays an error message or a prompt message, prompting the viewer to restart or replay the multimedia content. For example, the prompt message: "You have not entered the required digits in the time allocated, or you have entered the incorrect digits. Would you like to replay the advertisement?" is displayed, inviting the viewer to select either a "Yes" option, or a "No" option. If the viewer chooses to replay the multimedia content, the multimedia content is replayed and the procedure is repeated with another challenge-response sequence. If the viewer chooses not to replay the multimedia content, the response report is generated indicating the incorrect response in the previous attempt, and the play of the multimedia content is terminated.

Figure 2:
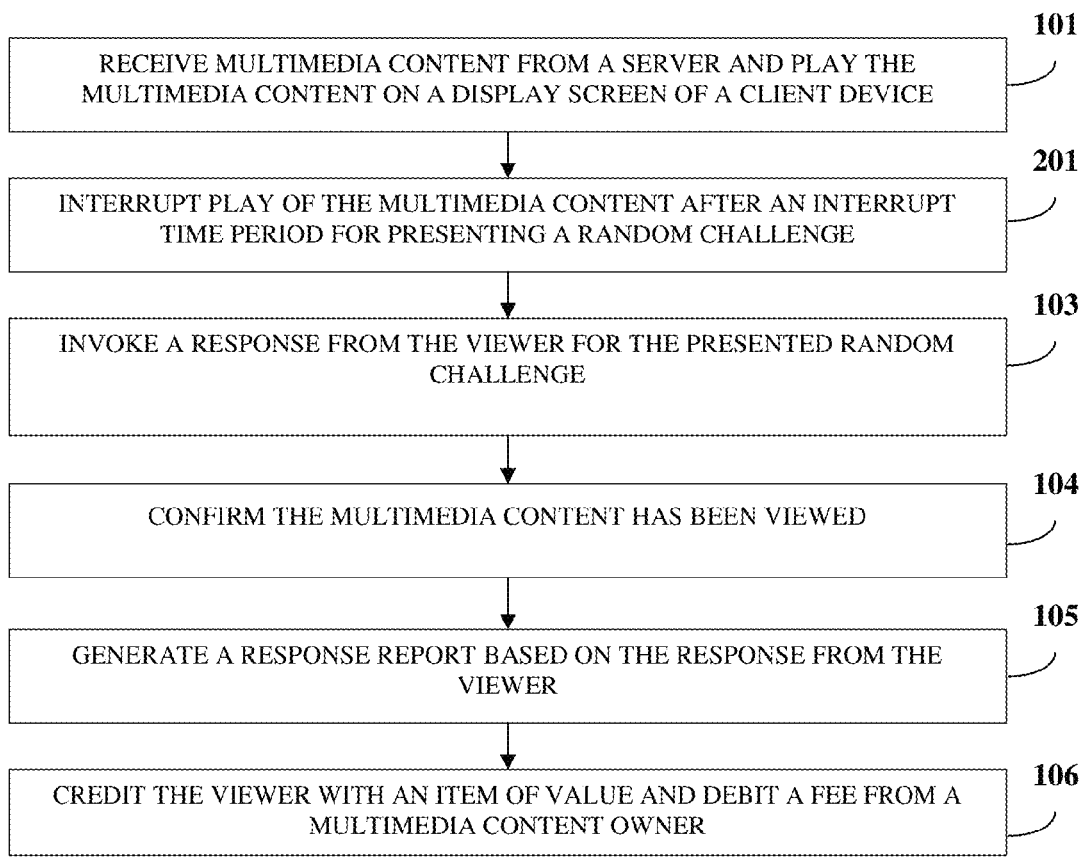
FIG. 2 illustrates a second embodiment of the computer implemented method for confirming that a viewer viewed multimedia content on a client device.

FIG. 2 illustrates a second embodiment of the computer implemented method for confirming that a viewer viewed multimedia content on a client device 301. One or more multimedia content owners upload multimedia content on the server 302 of the media service provider. The client device 301 of a viewer receives 101 the multimedia content, for example, an advertisement, a commercial message, an educational clip, an entertainment clip, etc., from the server 302 and plays the multimedia content on a display screen 301a the client device 301, for example, in an audiovisual format. The play of the multimedia content is interrupted 201 after an interrupt time period for presenting a random challenge. The interrupt time period is less than the duration of the multimedia content. The random challenge content is generated and displayed at random on the multimedia content. The random challenge is presented to the viewer by overlaying the random challenge on the multimedia content as explained in the detailed description of FIG. 1. A response is invoked 103 from the viewer for the presented random challenge. If the viewer enters the response to the presented random challenge, the response confirms 104 that the multimedia content has been viewed by the viewer. A response report is generated 105 based on the response from the viewer. The viewer is credited 106 with an item of value, if the response report confirms the multimedia content was viewed by the viewer, while the multimedia content owner is debited a fee.

In an embodiment, the client device 301 receives a list of multimedia content from the server 302 for selection by the viewer as explained in the detailed description of FIG. 1. The multimedia content selected by the viewer is rendered on the client device 301 and the duration of the selected multimedia content is determined. The rendering of the multimedia content is interrupted after an interrupt time period for presenting a random challenge. The interrupt time period is less than the duration of the rendered multimedia content. For example, an audio-video clip of duration M seconds is interrupted, L seconds after the audio-video clip commences, for presenting a random challenge. The steps of rendering the viewer selected multimedia content, interrupting the multimedia clip for presenting a random challenge, invoking a response, and generating a response report may be repeated for other multimedia content in the list depending on the selection of the viewer. In an embodiment, the interrupted multimedia content is not resumed until a correct response is submitted for the random challenge by the viewer.

The interrupt time period is generated using a random generator 302g. A timer 301f is provided to begin counting the interrupt time period at the start of the play of the multimedia content. When the timer 301f reaches the interrupt time period, the play of the multimedia content is interrupted at a random time to present the random challenge to the viewer on the client device 301.

FIG. 3 illustrates a computer implemented system for confirming that a viewer viewed multimedia content on a client device 301. The computer implemented system comprises a server 302 and a client device 301 connected via a network 303. The client device 301 comprises a display screen 301a, an input means (not shown), a transceiver 305, and a timer 301f. The server 302 comprises an upload module 302f, a network interface 302e, a report receiving module 302a, a media database 302d, a media aggregator 302c, and a payment module 302b. The system disclosed herein further comprises a view confirmation module 301b provided on the client device 301 or the server 302. The server 302 provides multimedia content to a viewer.

The upload module 302f enables one or more multimedia content owners to upload the multimedia content on the server 302. The client device 301 connects to the server 302 via the network 303 for receiving the multimedia content from the server 302. The multimedia content is played on the display screen 301a of the client device 301. The view confirmation module 301b on the server 302 or the client device 301 confirms that the viewer has viewed the multimedia content on the client device 301. The view confirmation module 301b comprises a challenge generator 301c, a challenge-response module 301d, and a report generation module 301e. The challenge generator 301c generates a random challenge that is random in content, presented at random times during and/or after play of the multimedia content, and presented at random physical locations on the multimedia content. The challenge generator 301c may also generate a pseudorandom challenge as explained in the detailed description of FIG. 1. The challenge-response module 301d presents the generated random challenge to the viewer on the display screen 301a of the client device 301 by overlaying the generated random challenge on the multimedia content. The challenge-response module 301d presents one or more random challenges at one or more times during and/or after the multimedia content is played. The timer 301f counts an interrupt time period for interrupting the playing of the multimedia content and presenting the random challenge, wherein the interrupt time period is less than duration of the multimedia content.

The challenge-response module 301d invokes a response from the viewer for the presented random challenge. The viewer enters the response to the presented random challenge using the input means on the client device 301. The timer 301f ensures that the viewer provides the response to the random challenge within the predetermined period of time after the random challenge is presented. The challenge-response module 301d determines if the viewer enters a response for the presented random challenge. The response confirms that the multimedia content has been viewed by the viewer. The challenge-response module 301d also determines if the response from the viewer to the presented random challenge is correct. A correct response confirms that the multimedia content has been viewed by the viewer. The report generation module 301e generates a response report based on the response from the viewer and transmits the response report to the server 302.

The payment module 302b credits the viewer with an item of value and debits a fee from the multimedia content owner, if the response report confirms that the multimedia content was viewed by the viewer In an embodiment, the payment module 302b credits the viewer with an item of value and debits a fee from the multimedia content owner for each correct response that the viewer provides to one or more of the presented random challenges.

The server 302 transmits multimedia content to the viewer either on request or automatically. The media database 302d stores several multimedia content files in different formats, and is updated after every cycle of production of the multimedia content. The multimedia content stored in the media database 302d comprises audio, video, internet web pages, interactive games and applications, and other playable formats. The media aggregator 302c queries the media database 302d and prepares a list of multimedia content available for distribution over the network 303. The network interface 302e connects the server 302 to the network 303, such as the internet, a wireless network, or a wired network.

The client device 301 comprises a transceiver 305 that connects the client device 301 to the server 302 via the network 303. In the case of a cellular client device, the transceiver 305 communicates with the server 302 via a cellular telephone network 304. The input means accepts a selection of the multimedia content from the viewer. The client device 301 is capable of downloading, storing, and rendering multimedia content of one or more formats obtained from the server 302. The multimedia content, incorporating the challenge-response mechanism, may also be transmitted through the network 303 and rendered on a web browser in an internet enabled client device or mobile phone as streaming multimedia content. The multimedia content may also be distributed to televisions via integrated receivers/decoders or set top boxes and viewed through interactive television. In an example, the multimedia content is made available in an interactive group setting or multi-viewer environment, such as a focus group, for viewing the multimedia content, discussing, testing, or any other purposes.

The challenge-response module 301d in the view confirmation module 301b presents a random challenge by briefly overlaying the random challenge on the multimedia content being played. The challenge-response module 301d invokes a response from the viewer for the random challenge. In an embodiment, the server 302 comprises the view confirmation module 301b either in addition to or as a substitute for the challenge-response module 301d on the client device 301. The report receiving module 302a receives the response report transmitted by the client device 301. The payment module 302b in communication with the report receiving module 302a generates and maintains a monetary credit for the viewer based on the response report.

In an embodiment, the client device 301 downloads the multimedia content when the client device 301 is connected to the server 302. If eventually the viewer launches the view confirmation module 301b when the connection to the server 302 is inactive, the client device 301 renders the downloaded multimedia content in an off-line mode, performs a challenge-response interaction with the viewer, and generates and stores the response report. The off-line mode is triggered when the connection to the server 302 is inactive. When a connection to the server 302 is established via, for example, satellite, the network 303, etc., the response report is transmitted to the server 302 over the connection. In another embodiment, the client device 301 renders the multimedia content transmitted by the server 302 as streaming multimedia content. If the viewer launches the view confirmation module 301b when the connection to the server 302 is active, the client device 301 renders the multimedia content in an online mode. In an embodiment, the challenge-response interaction with the viewer is performed by the view confirmation module 301b on the server 302. The response report generated after completing the challenge-response interaction is transmitted to the server 302 over the active connection. The response report is also generated by the view confirmation module 301b on the server 302 in the online mode.

In an embodiment, the server 302 may periodically notify the viewer of the available multimedia content, such as advertisements, including the amount payable to the viewer for viewing each advertisement. The server 302 also notifies the viewer of the available advertisements upon request of the viewer. For example, the server 302 periodically transmits short message service (SMS) messages to the client device 301, for example, a cellular phone of the viewer. In another example, the server 302 may notify the viewer by broadcasting unstructured supplementary service data (USSD) messages. Upon the request of the viewer, the server 302 may transmit an updated list of multimedia content to the client device 301 for selection and viewing by the viewer.

In an embodiment, the server 302 further comprises a registration facility whereby a potential viewer registers the client device 301 for the media service. During the registration process, the viewer is requested to submit the unique identifier of the client device 301, an identity of the viewer, and optionally a password or a personal identification number (PIN) for authentication, and a credit account number. After completing the registration process, a user identifier (ID) and suitable software module, such as, the view confirmation module 301b is supplied to the client device 301 of the viewer. The view confirmation module 301b is executed for programming the client device 301 of the viewer, whereby the client device 301 is rendered capable of establishing a client-server relationship with the server 302.

In an example, the viewer requests the server 302 to access the service through the client device 301. The server 302 verifies whether the viewer is authenticated to access the service by requesting the user identifier supplied during registration, and transmits multimedia content to the client device 301 for selection. If the server 302 fails to authenticate the viewer, the server 302 prompts the viewer to undergo the registration process. The viewer may choose to continue with the registration process or terminate the connection to the server 302. After the viewer is authenticated, the multimedia content is received by the client device 301. The client device 301 launches the view confirmation module 301b and the display screen 301a presents a menu with options for displaying the list of multimedia content including the monetary amount payable to the viewer for viewing each multimedia content item in the list. The viewer selects a desired multimedia content item using the menu, and the selected multimedia content item is played to the viewer. The challenge-response module 301d presents the random challenge and invokes a response during or after the multimedia content is played.

The report generation module 301e generates a response report with report details based on the response received from the viewer. The client device 301 verifies whether the connection to the server 302 is active, and transmits the response report to the server 302. The report receiving module 302a receives the response report and instructs the payment module 302b to credit the viewer's account with a designated amount of money. If the connection to the server 302 is temporarily unavailable, the response report is temporarily stored in the client device 301, and transmitted when the connection is available again. The recently viewed multimedia content is deleted from the list, and the list of available multimedia content is updated and displayed again on the client device 301 for repeating the steps described above. Alternatively, the viewer may choose to terminate the view confirmation module 301b at this point by selecting an exit option from the menu.

Figure 4:
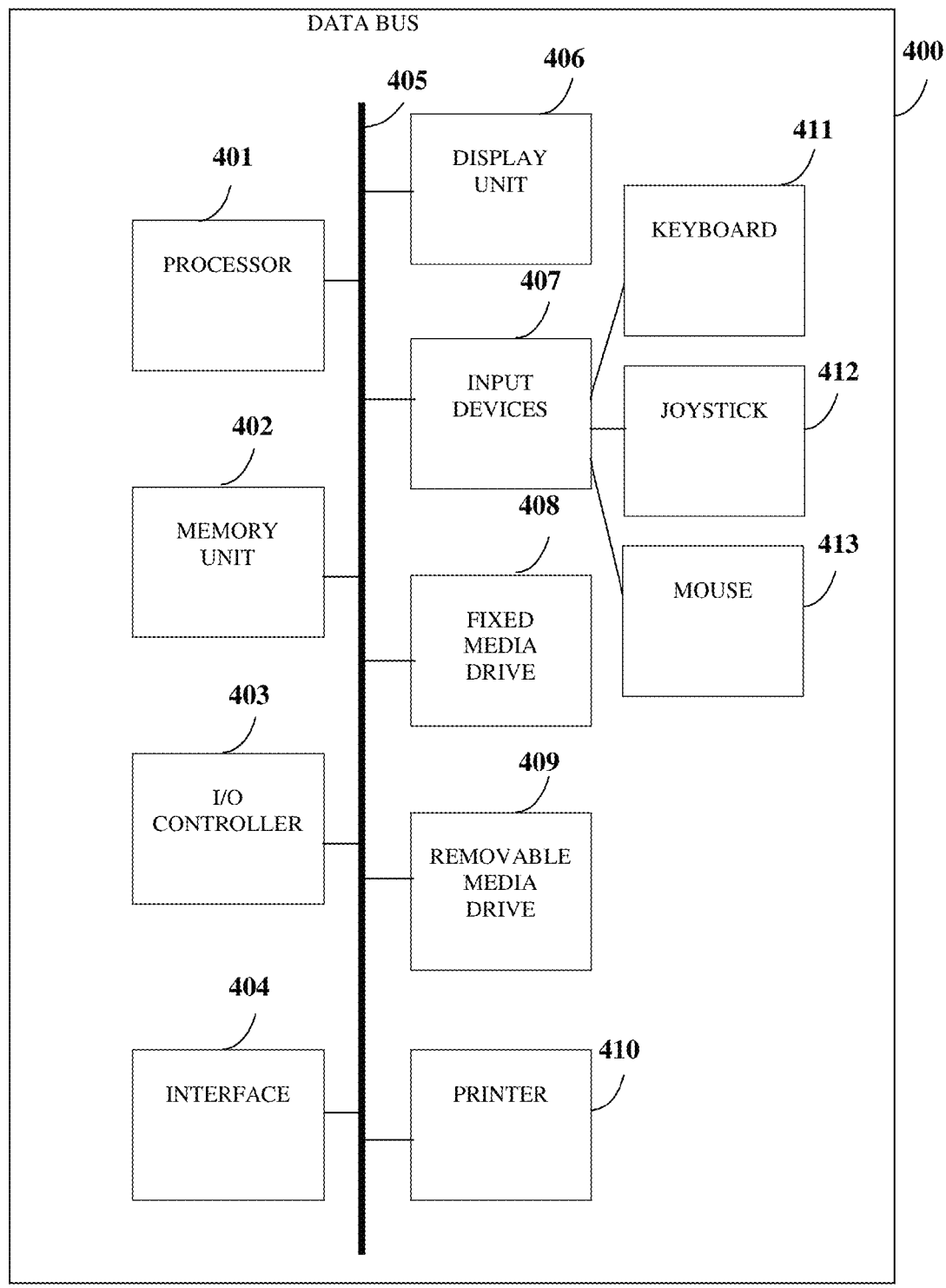
FIG. 4 exemplarily illustrates a computer system architecture employed on the client device and a server of a media service provider.

FIG. 4 exemplarily illustrates a computer system architecture employed on the client device 301 and the server 302 of the media service provider. The computer system 400 executes the view confirmation module 301b. The computer system 400 comprises a processor 401, a memory unit 402 for storing programs and data, an input/output (I/O) controller 403, an interface 404, and a display unit 406 communicating via a data bus 405. The memory unit 402 comprises a random access memory (RAM) and a read only memory (ROM). The computer system 400 further comprises one or more input devices 407, for example, a keyboard 411 such as an alphanumeric keyboard, a mouse 413, a joystick 412, a touch-sensitive screen, etc. The computer system 400 communicates with other computer systems through the interface 404, comprising, for example, a Bluetooth® interface, an infrared (IR) interface, a WiFi interface, a universal serial bus interface (USB), a local area network or wide area network (LAN or WAN) interface, etc.

The computer system 400 further comprises a fixed media drive 408 and a removable media drive 409 for receiving removable media. The computer system 400 further comprises output devices, for example, a printer 410 for receiving and reading digital data on a compact disk, a digital video disk or other medium. Computer applications or programs are used for operating the computer system 400. The programs are loaded onto the fixed media drive 408 and into the memory unit 402 of the computer system 400 via the removable media drive 409. Applications are executed by double clicking a related icon or menu displayed on the display unit 406 using the mouse 413 or through other input devices 407. Further the computer system 400 employs an operating system for performing multiple tasks. The operating system manages execution of the view confirmation module 301b and other modules of the client device 301 or the server 302. The operating system further manages security of the computer system 400, peripheral devices connected to the computer system 400, and network connections. The operating system recognizes keyboard inputs and pointing device inputs of a viewer, output display, files and directories stored locally on the fixed media drive 408. Different programs, for example, web browser, e-mail application, etc. initiated by the viewer are executed by the operating system with the help of the processor 401, for example, a central processing unit (CPU). The operating system monitors the use of the processor 401.

The instructions from the view confirmation module 301b are stored in the memory unit 402. The multimedia content is transferred from the media database 302d to the view confirmation module 301b through the interface 404 and via the network 303. A viewer initiates the execution of the view confirmation module 301b by double clicking on the icon for the view confirmation module 301b on the display unit 406 or the execution of the view confirmation module 301b is automatically initiated on transmitting multimedia content to the view confirmation module 301b. The CPU retrieves instructions for executing the view confirmation module 301b from various modules, for example, the challenge generator 301c, the challenge-response module 301d, and the report generation module 301e in the view confirmation module 301b. The locations of the instructions in the modules 301c, 301d, and 301e are determined by a program counter (PC). The program counter stores a number that identifies the current position in the program of the view confirmation module 301b. The instructions fetched by the CPU from the program memory after being processed are decoded. The instructions are placed in an instruction register (IR) in the CPU. After processing and decoding, the CPU executes the instructions. The instructions comprise, for example, rendering the multimedia content selected by the viewer, presenting a random challenge by overlaying the random challenge on the multimedia content, generating a response report for the viewer, etc. At the time of execution, the instructions stored in the instruction register are examined to determine the operations to be performed. The specified operation is then performed by the CPU. The operations include arithmetic and logic operations.

The operating system performs multiple routines for performing a number of tasks required to assign input devices 407, output devices, and memory for execution of the view confirmation module 301b. The tasks performed by the operating system comprise assigning memory to the view confirmation module 301b and data, moving data between memory and disk units and handling input/output operations. The operating system performs the tasks on request by the operations and after performing the tasks, the operating system transfers the execution control back to the CPU. The CPU continues the execution to obtain one or more outputs. The outputs of the execution of the view confirmation module 301b are displayed to the viewer on the display unit 406.

An exemplary server setup as illustrated in FIG. 3 comprises a media database 302d for storing multimedia content of commercial, educational, and entertaining in nature. For example, multimedia content such as advertisement media clips are obtained in suitable formats from advertisement agencies or media representatives of product and service companies, and uploaded to the media database 302d. In another example, the advertisement agencies or the media representatives undertaking extensive campaigning may add new advertisement media clips, and update or modify existing advertisement media clips by accessing the media database 302d. The media aggregator 302c recognizes changes made to the contents of the media database 302d, including metadata changes, for example, changes in the duration of the advertisement media clips, the names of the advertisement media clips, etc., and prepares and updates the list of multimedia content.

The server 302 may allow controlled access to the server 302 and the resources therein, such as the media database 302d, through a web front-end. An example of such a web front-end is a website, for example, http://www.beezag.com. The advertisement agencies or the media representatives are required to setup an account for themselves by registering as an approved advertiser through the web front-end before submitting their advertisement clips. The approval workflow for registering advertiser accounts and uploading advertisement clips may be assigned to process owners or administrators on a regional basis. Furthermore, the approval workflow may include different stages of approval such as account-level approval, financial approval, and publishing approval. After the advertiser registers an account, the advertiser may upload advertisement clips and other multimedia content into the media database 302d for distribution to targeted viewers. The advertiser may be charged designated amounts for each confirmed view and non-confirmed view response report received by the server 302.

The advertisement multimedia clips comprise, for example, audio clips, video clips, animations, still images, text attachments, or suitable combinations of these. The advertisement clips also comprise promotional segments such as universal resource locators (URLs) directing viewers to the web front-end or other proprietary websites of the product and service companies. The promotional segments may also include digital coupons or vouchers redeemable for special discounts on advertised products and services, questionnaire for sharing additional information, etc. The coupons and vouchers may also be distributed to targeted viewers via SMS messages.

In an embodiment, the viewer is prompted to share the viewed multimedia content, such as advertisement clips through the view confirmation module 301b on the client device 301 or the server 302. The viewers may share the advertisement clips by syndicating or micro-blogging the advertisement clips on social networking websites such as Twitter™, Facebook™, Myspace™, etc., or by forwarding the advertising clips through email services and SMS.

Figure 5A:
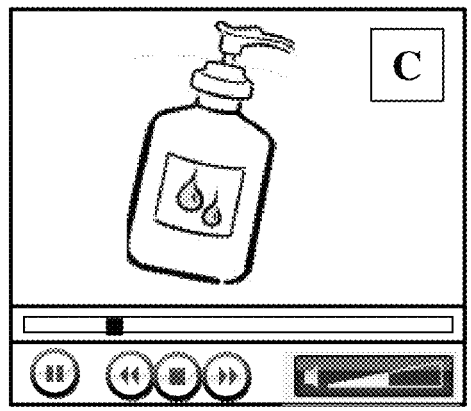
FIGS. 5A-5D exemplarily illustrate screen shots for a video advertisement campaign.
Figure 5B:
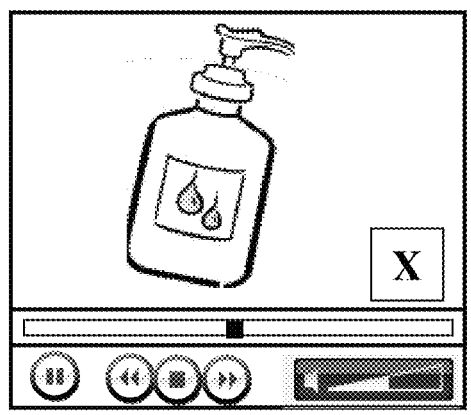
Figure 5C:
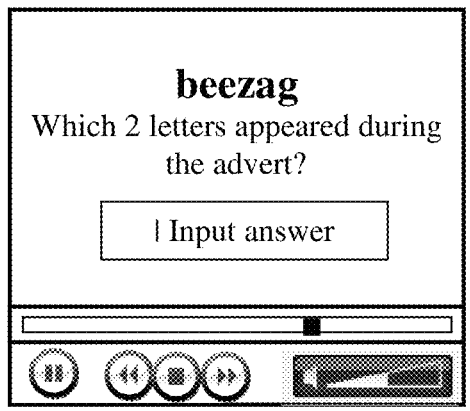
Figure 5D:
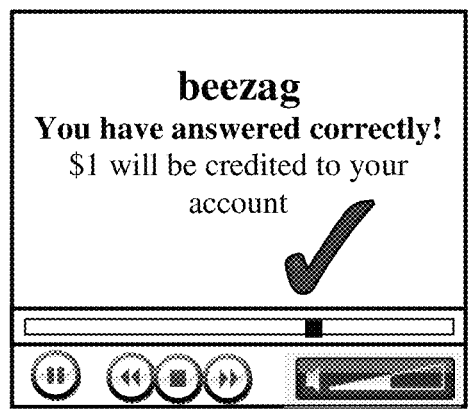
Figure 6A:
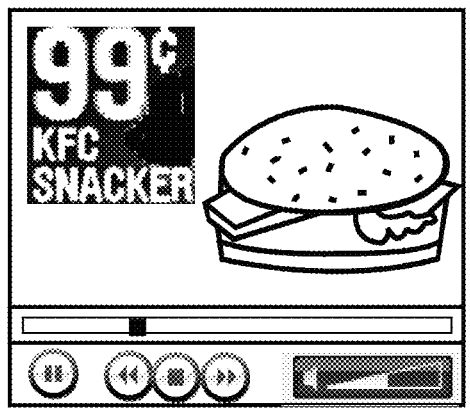
FIGS. 6A-6D exemplarily illustrate screen shots for a video advertisement campaign.
Figure 6B:
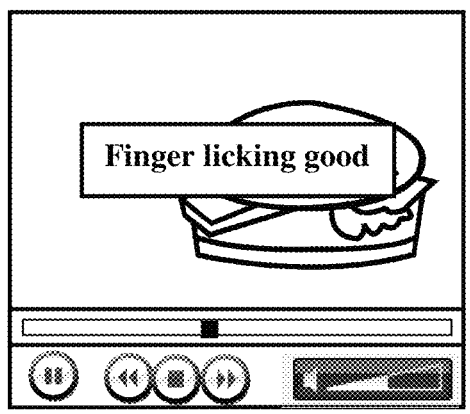
Figure 6C:
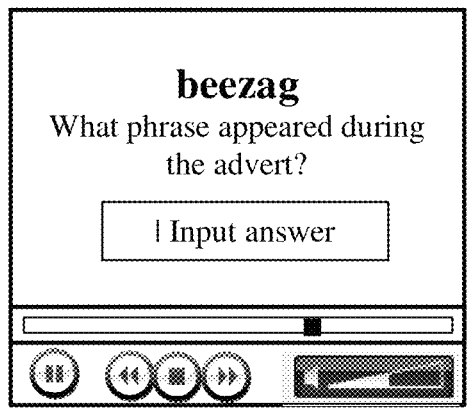
Figure 6D:
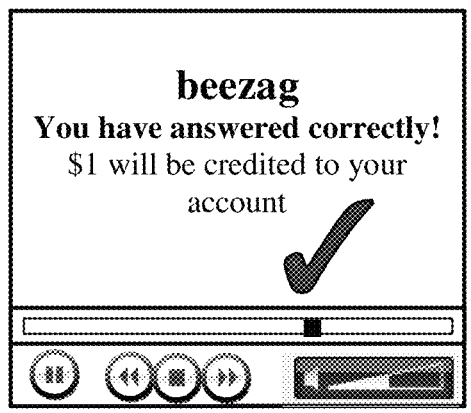
Figure 7A:
FIGS. 7A-7D exemplarily illustrate screen shots of a training video for managers.
Figure 7B:
Figure 7C:
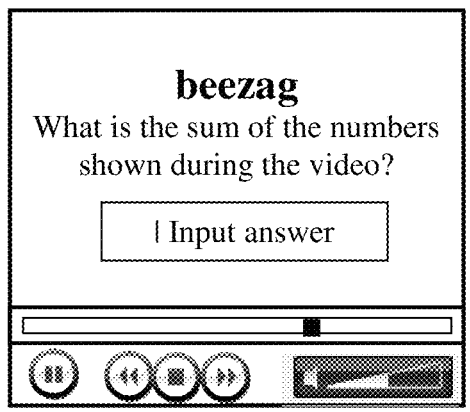
Figure 7D:
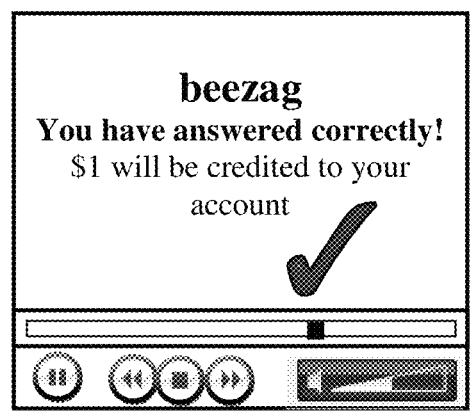
Figure 8A:
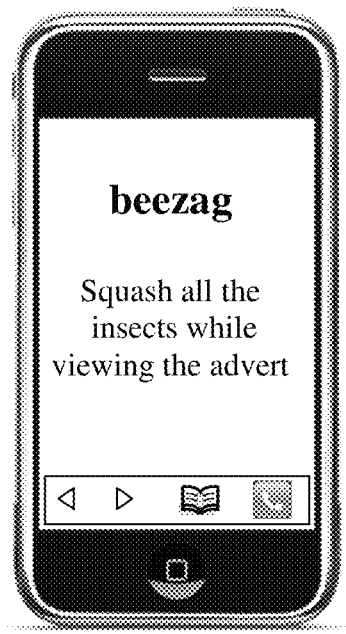
FIGS. 8A-8D exemplarily illustrate screen shots for an iPhone application and coupon offer.
Figure 8B:
Figure 8C:
Figure 8D:
Figure 9A:
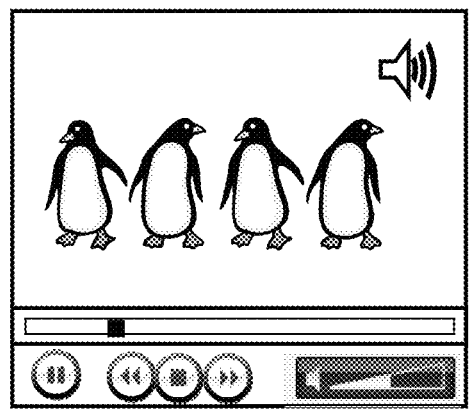
FIGS. 9A-9D exemplarily illustrate screen shots for a video advertisement campaign.
Figure 9B:
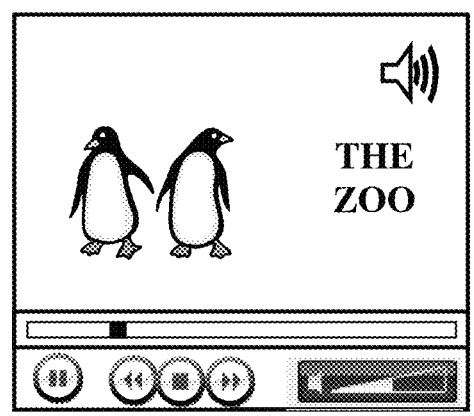
Figure 9C:
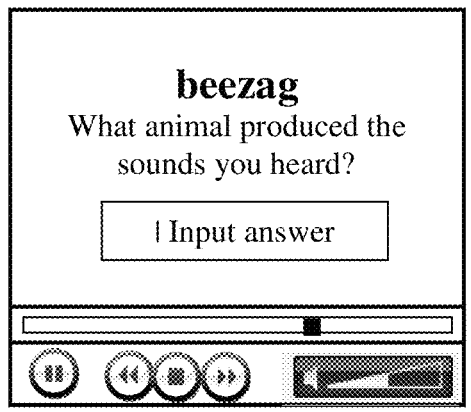
Figure 9D:
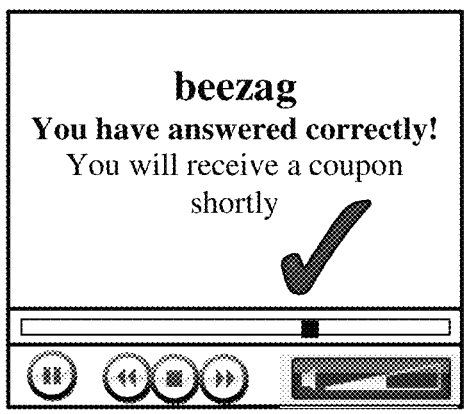

Enumerated herein are examples of the computer implemented method and system disclosed herein, categorized by the challenge content and the invoked response. In an example, the challenge content and the invoked response comprise visual and mentally-solvable challenge-responses. For example, Pfizer Inc. creates a video advertisement for Purell® hand sanitizer targeted for mothers of children between the ages of 5 to 21. A video advertisement campaign is created and uploaded into the media database 302d using the upload module 302f, via the web front-end of the media service provider, for delivery to the target demographic membership selected in the web front-end. FIGS. 5A-5D exemplarily illustrate screen shots for a video advertisement campaign for the hand sanitizer. An alphanumeric-based challenge comprising random letters is presented to the viewer during the play of the video advertisement. A first letter "C" occurs at 10 seconds into the video advertisement and is placed in the top right corner of the display screen 301a as illustrated in FIG. 5A. A second letter "X" occurs 5 seconds before the end of the video advertisement and is placed in the bottom right corner of the display screen 301a as exemplarily illustrated in FIG. 5B. When the video advertisement ends, the viewer is presented with a question, for example, "Which two letters appeared during the advert?" as exemplarily illustrated in FIG. 5C. If the viewer answers the question correctly, viewing of the video advertisement by the viewer is confirmed. The view confirmation module 301b sends a message, for example, "You have answered correctly!" as exemplarily illustrated in FIG. 5D and credits an item of value, for example, $1, to the viewer's account. The view confirmation module 301b enables control of random challenge variables, for example, the number of alphanumeric characters presented during the advertisement play, the timing of the appearance and disappearance of the alphanumeric characters, a threshold accuracy of the viewer's response to the challenge to register a positive response, the time-out period for the response, etc.

In another example, Kentucky Fried Chicken (KFC®) Corporation creates a video advertisement for their new chicken snacker targeted for men and women between the ages 18 to 55 in northeast United States. A video advertisement campaign is created and uploaded into the web front-end for delivery to the target demographics. FIGS. 6A-6D exemplarily illustrate screen shots for a video advertisement campaign for KFC's chicken snacker. A keywords and phrases based challenge comprising a random word or phrase is presented to the viewer during the play of the video advertisement. During the play of the video advertisement as exemplarily illustrated in FIG. 6A, the phrase "Finger Licking Good!" is presented in a child window as exemplarily illustrated in FIG. 6B. When the video advertisement ends, the viewer is presented with a question about the words or phrases presented during the video advertisement as exemplarily illustrated in FIG. 6C. If the viewer answers the question correctly, the viewer confirms viewing of the video advertisement as exemplarily illustrated in FIG. 6D. Amongst the random challenge variables, a variable in this example is the description of the keywords and phrases in a predefined set for random selection. The phrases in the predefined set comprise, for example, "Think KFC", "Finger Licking Good", "We do chicken right", "There's Fast Food, Then There's KFC", etc.

In another example, a human resource consultancy creates a sexual harassment training video for managers of employees in the state of California. The video is delivered online in discreet video chapters. FIGS. 7A-7D exemplarily illustrate screen shots of a training video for managers. A mathematical equation based challenge is selected by the consultancy, comprising a random equation, for example, 3+4=?, or random numbers such as "6" and "2" as exemplarily illustrated in FIGS. 7A-7B. This mathematical equation based challenge is presented to the viewer during the video chapter. When the video chapter ends, the viewer is presented with an opportunity to submit a solution to the mathematical equation, such as, "What is the sum of the numbers shown during the video?" as exemplarily illustrated in FIG. 7C. If the viewer answers the question correctly, the viewer confirms viewing of the video chapter as exemplarily illustrated in FIG. 7D. Amongst the random challenge variables, a variable in this example is the degree of difficulty of the random equations depending on the operators in the equation.

In another exemplary category, the challenge content and the invoked response comprise visual and motor based challenge-responses. Johnson & Son, Inc. creates an iPhone application and coupon offer for Off!@ Insect Repellants targeted for iPhone users herein referred to as "viewers". FIGS. 8A-8D exemplarily illustrate the screen shots for an iPhone application and coupon offer. The iPhone application randomly overlays and removes images of mosquitoes and other bugs as exemplarily illustrated in FIG. 8B-8C during the play of a video and requests the viewer to, for example, "Squash all the insects while viewing the advertisement" as exemplarily illustrated in FIG. 8A. In responding to the challenge in real time, the viewer touches the iPhone screen for simulating squashing of the random bugs that appear during the video. When the video ends, the viewer is presented with a score reflecting the viewer's performance. If the score is sufficient, the viewer is presented with a digital coupon as exemplarily illustrated in FIG. 8D. If the score is insufficient, the viewer has the opportunity to replay. The random challenge variables, such as, the number of bug images presented during the video play, the timing of the appearance and disappearance of the bug images, a threshold score for earning a coupon, etc., is implemented in the iPhone application.

In another example, Johnson & Son, Inc. creates a web-based gaming application and coupon offer for "Off! Insect Repellants" targeted for males and females of ages 18 to 55 and above in the southeast, United States. The web-based gaming application randomly overlays and removes images of mosquitoes and other bugs during the play of a video. In responding to the challenge in real time, the viewer right-clicks over as many bug images as possible on a computer monitor screen, for simulating squashing of the random bugs, before the video ends. When the video ends, the viewer is presented with a score reflecting the viewer's performance. If the score is sufficient, the viewer is presented with a digital coupon to print or forward to a mobile client device. If the score is insufficient, the viewer has the opportunity to replay.

In another example, the challenge content and the invoked response comprise audio based challenge-responses. For example, the San Diego zoo creates a video advertisement for the summer season targeting mothers in southern California. A video advertisement campaign is created and uploaded into the web front-end for delivery to the target demographics. FIGS. 9A-9D exemplarily illustrate the screen shots for a video advertisement campaign. A hear and type challenge is presented to the viewer with a question about the audio elements randomly inserted and overlaid onto the audio content of the video advertisement as exemplarily illustrated in FIGS. 9A-9B. The random audio elements comprise, for example, animal sounds, bird sounds, etc. The question is, for example, "What animal produced the sounds you heard?" as exemplarily illustrated in FIG. 9C. If the viewer answers the question correctly, the viewer confirms viewing of the video advertisement as exemplarily illustrated in FIG. 9D. Among the random challenge variables, a variable in this example is the type of audio elements in the predefined set for random selection and overlaying.

In another example, the San Diego zoo creates a mobile phone based marketing campaign for the summer season targeted at mothers in southern California. The marketing campaign involves a chance to win a 10% discount on adult entry ticket prices. The mobile phone based marketing campaign is created for delivery to the target demographics, and a hear and speak challenge-response is selected by the advertiser. A mobile phone user is notified of the marketing campaign through print advertisements or USSD broadcast messages directing the mobile phone user to call a phone number, listen to the summer events at the zoo, and win a 10% discount on the entry ticket price. When the mobile phone user calls, the mobile phone user is greeted with a recorded voice that lists the upcoming zoo events and attractions. The recorded voice is randomly interrupted, for example, by the sounds of animals and birds, etc. At the end of the call, the recorded voice presents the mobile phone user with a question about the audio elements randomly inserted and overlaid onto the recorded voice. The mobile phone user is then prompted to answer with a voice prompt, for example, "Speak your answer at the tone". The speech recognition software in the mobile phone or the server 302 processes the speech utterance representing the answer from the mobile phone user. If the mobile phone user answers the question correctly, the mobile phone user confirms that the mobile phone user has listened to the voice recording, and obtains a coupon by SMS. Amongst the random challenge variables, a variable in this example is the accuracy in recognizing the speech utterance that qualifies the mobile phone user to type in the answer using a keypad for a positive response.

Figure 11:
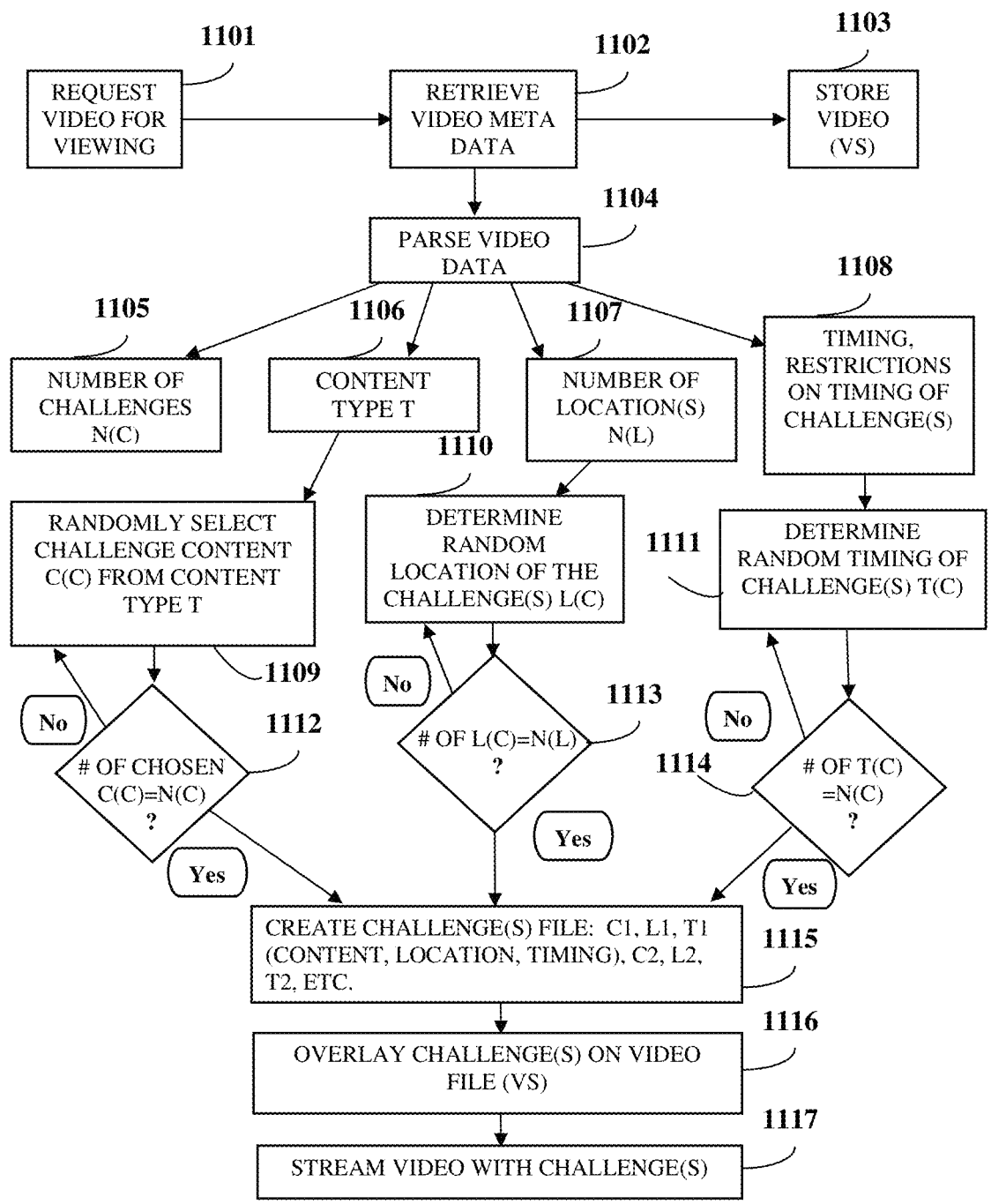
FIG. 11 exemplarily illustrates a flow diagram for generating and presenting random challenges on multimedia content.

FIG. 11 exemplarily illustrates a flow diagram for generating and presenting random challenges on multimedia content. The viewer requests 1101 a video for viewing from the server 302. The client device 301 receives the requested video and also retrieves 1102 the meta data associated with the video. The video is stored 1103 in the client device 301. The meta data of the video is parsed 1104 to determine, for example, the duration of the video. The challenge parameters, for example, the number of challenges 1105, the type of content 1106, the number of locations 1107 within predefined limits, the timing 1108 of the challenges including restrictions on the timing of the challenges are invoked based on the meta data of the video. One or more of the random challenge content is randomly selected 1109 from the available content types. The random locations and timing of the challenges are also determined 1110 and 1111. The selected content is verified to determine whether the challenge content is within the limits of the invoked parameters, such as the number of challenges 1112, number of locations 1113, timing restrictions 1114, etc. The challenge files are created 1115 with the selected challenge content, locations, and timing. The challenge content in the challenge files created are overlaid 1116 on the stored video. The video with the incorporated challenge content is streamed 1117 or played to the viewer.

FIGS. 12A-12G exemplarily illustrate a C++ implementation of the challenge generator 301c using Microsoft® Visual Studio® of Microsoft Inc. In the C++ code listing including the header files of FIGS. 12A-12G, two test cases are established for the challenge generator 301c. The two test cases are defined in the C++ code listing of FIG. 12A. The first test case generates a sequence of challenges for a 30 second video until the end of the video. The second test case generates a challenge within every 10 second segment of a video clip. The implementation exemplarily comprises two classes, namely, "Class bzChallengeGenerator" and "Class bzChallenge". The code for implementing the "Class bzChallengeGenerator" is exemplarily illustrated in FIGS. 12B-12C. The code for implementing the "Class bzChallenge" is exemplarily illustrated in FIG. 12F. FIGS. 12D-12E and FIG. 12G illustrate example header file definitions of "bzChallengeGenerator.h" and "bzChallenge.h". "Class bzChallengeGenerator" is used to specify the necessary parameters and generate a challenge within an optional sub-segment of the video. The static members of "Class bzChallengeGenerator" comprise the following:

"static const char*s_content[ ]" is an array of arrays of character instances comprising numbers, letters, or symbols. This implementation assumes that the challenge content data type is, for example, a single byte character, however the content's data type has alternate definitions in other implementations.

"static const unsigned int s_contentDuration" is the duration of the display of the content. For example, this value is kept constant at 3 seconds in this implementation, but may vary in other implementations.

Class bzChallengeGenerator also defines an enumerated data type as follows:

"enum ContentTypeEnum {NUMBERS=0, LETTERS=1, SYMBOLS=2}" identifies the character set to be used.

Class bzChallengeGenerator also defines the following data members:

"ContentTypeEnum m_contentType" defines the type of characters to be displayed in the video as a challenge.

"unsigned int m_contentDisplaySize" defines the size of the content's display area (square), in pixels, within a video display frame.

"unsigned int m_videoDisplayWidth" is the width of the video display frame, in pixels.

"unsigned int m_videoDisplayHeight" is the height of the video display frame, in pixels.

"unsigned int m_videoDuration" is the total play time of the video.

The following methods are defined in the Class bzChallengeGenerator:

"static int RangedRand(int from, int to)"—this class method returns a random integer in the closed interval [from, to].

"bzChallenge Generate(int begin=-1, int end=-1) const"—this method generates a random challenge with the specified properties. The caller optionally specifies the end points of a segment within the entire video in order to satisfy timing constraints of the application, for example, to ensure that a challenge is displayed in the last 20% or 10 seconds of the video's play time. An object of type bzChallenge is returned with the necessary attributes.

Class bzChallenge represents a result of the challenge generator 301c in the form of a challenge object. Class bzChallenge defines the following data members:

"char m_content"—selection of challenge content to display.

"unsigned int m_contentDisplaySize"—content display area in pixels (square).

"unsigned int m_offset"—offset in seconds from the beginning and the end of the video when the challenge content is displayed.

"unsigned int m_duration"—the duration of the display of challenge content.

"unsigned int m_xPosition"—the pixel position along the width of the display area where the challenge content is displayed.

"unsigned int m_yPosition"—the pixel position along the height of the display area where the challenge content is displayed.

This implementation randomly selects a position for the challenge content's display area within the specified dimensions of the video display frame. Alternatively, the implementation uses an external location map that defines discrete placements of the challenge content on the video display frame. In the alternative case, the challenge generator 601c randomly selects an index into the location map. FIG. 17 exemplarily illustrates sample output after executing the two test cases twice, referred to as "Run #1" and "Run #2". In an example of the first test case, the challenge generator 601c generates "3" as the challenge content that will be presented after 19 seconds from the start of the multimedia content for a duration of 3 seconds. The challenge generator 601c then generates "2" as the challenge content that will be presented after 26 seconds from the start of the multimedia content for a duration of 3 seconds. The challenge generator 601c also generates the coordinates (233, 8) and (29, 134) as the locations for presenting the challenge content "3" and "2" respectively, wherein the coordinates are selected within the video display frame. In an example of the second test case, the challenge generator 601c generates "7" as the challenge content that will be presented within the first 10 second segment, then generates "2" as the challenge content that will be presented within the second 10 second segment, and generates "9" as the challenge content that will be presented within the third 10 second segment. The challenge generator 601c also generates the coordinates (89, 16), (58, 171), and (151, 109) as the locations for presenting the challenge content "7", "2", and "9" respectively, wherein the coordinates are selected within the video display frame. Accordingly, the challenge generator 601c can generate a theoretically infinite number of new challenges, random in content, based on permutation and combination of the input to the challenge generator 601c and the challenge generation algorithm.

For the purposes of illustration, the detailed description refers to a single client device 301; however the scope of the method and system disclosed herein is not limited to the client device 301 but may be extended to include multiple client devices and multiple levels of clients.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the media database 302d, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for confirming that a viewer viewed one of a plurality of multimedia content on a client device, comprising:
    receiving multimedia content from a server and playing said multimedia content on a display screen of said client device;
    determining presence of a random challenge generator on said client device, and based on said determination:
        generating a random challenge in said client device upon presence of said random challenge generator in said client device; and
        receiving a random challenge from said server upon absence of said random challenge generator in said client device, wherein said server is capable of generating an infinite number of random challenges;
    displaying said random challenge as an overlay on said multimedia content, and wherein said random challenge is:
        random in content, wherein content of each random challenge is new with respect to the content of any other random challenge presented on said client device;
        unrelated to said multimedia content;
        presented at random times during and/or after play of said multimedia content; and
        presented at random physical locations on said multimedia content;
    receiving a response for said presented challenge;
    confirming said multimedia content has been viewed by said viewer, wherein said client device checks for correctness of said response, and wherein said confirmation is based on said correctness of said response;
    generating and storing a response report based on said response from said viewer.

2. The computer implemented method of claim 1, wherein said challenge comprises one or more of a random number, a random icon, a random shape, a product logo, a service logo, a random color, a random mathematical equation, and a random target on said display screen of said client device for said viewer to interact therewith using one of touch and a pointing device.

3. The computer implemented method of claim 1, wherein said challenge is presented at one or more times during and/or after said one of the plurality of multimedia content is played.

4. The computer implemented method of claim 1, wherein said challenge changes for each of the plurality of multimedia content viewing.

5. The computer implemented method of claim 1, further comprising the step of determining play duration of said multimedia content, wherein said challenge is presented during and/or after said play duration of said multimedia content.

6. The computer implemented method of claim 1, wherein said challenge comprises one or more random numbers presented at different points in time, and wherein said response provided by said viewer to said challenge comprises a reproduction of said one or more random numbers by entering said one or more random numbers into said client device.

7. The computer implemented method of claim 1, wherein said challenge is a random geometrical shape presented at different points in time, and wherein said response by said viewer to said challenge comprises selection of an option representing said geometrical shape from an options list.

8. The computer implemented method of claim 1, wherein said challenge is a random mathematical equation, and wherein said response by said viewer to said challenge comprises entering a result of said mathematical equation into said client device.

9. The computer implemented method of claim 1, wherein said challenge is a random icon, and wherein said response by said viewer to said challenge comprises selection of an option representing said icon from an options list.

10. The computer implemented method of claim 1, wherein said challenge is one of a product logo and a service logo, and wherein said response by said viewer to said challenge comprises selection of an option representing said product logo and said service logo from an options list.

11. The computer implemented method of claim 1, further comprising the step of presenting a plurality of challenges at one or more times during or after said multimedia content is played.

12. The computer implemented method of claim 1, wherein said response is invoked from said viewer at the end of said play of said multimedia content.

13. The computer implemented method of claim 1, wherein said viewer is requested to provide a response to said challenge within a predetermined period of time after said challenge is presented.

14. The computer implemented method of claim 1, wherein said multimedia content comprises one or more of an advertisement, a commercial message, an educational clip, and an entertainment clip.

15. The computer implemented method of claim 1, wherein said challenge appears randomly on a multimedia player frame within said display screen of said client device.

16. The computer implemented method of claim 15, wherein said challenge appears immediately outside a boundary of said multimedia player frame and scrolls in one of an upward direction and a downward direction on either side of said multimedia player frame.

17. The computer implemented method of claim 15, wherein said challenge appears immediately outside a boundary of said multimedia player frame and scrolls in one of a rightward direction and a leftward direction of said multimedia player frame, in a region above or below said multimedia player frame.

18. The computer implemented method of claim 15, wherein said challenge appears at a number of unique positions within said multimedia player frame based on physical coordinates selected within said multimedia player frame.

19. A computer implemented system for confirming that a viewer viewed one of a plurality of multimedia content on a client device, comprising:
a server for providing the plurality of multimedia content for playing said multimedia content on a display screen on said client device;
a view confirmation module on said server for confirming that said viewer viewed said selected multimedia content on said client device, wherein said view confirmation module comprises:
a challenge generator capable of generating an infinite number of random challenges, wherein each of said random challenge is:
random in content, and wherein content of each random challenge is new with respect to the content of any other random challenge generated and presented to said first viewer, said one or more second viewers, said one or more third viewers, and said one or more nth viewers;
unrelated to said multimedia content;
presented at random times during and/or after play of said multimedia content; and
presented at random physical locations on said multimedia content;
a challenge-response module on said client device for presenting said random challenge to said viewer on said display screen of said client device by overlaying said provided random challenge on said multimedia content, wherein said challenge response module receives a response from said viewer for said presented random challenge;
wherein said response received from said viewer is determined to be one of a correct response and an incorrect response;
a report generation module on said server for generating a response report based on said determination of one of a correct response and an incorrect response.

20. The computer implemented system of claim 19, wherein said client device is one of an internet-enabled mobile device, a computer with a web browser, and a set top box capable of delivering interactive multimedia content.

21. The computer implemented system of claim 19, wherein said challenge comprises one or more of a random number, a random icon, a random shape, a product logo, a service logo, a random color, a random mathematical equation, and a random target on said display screen of said client device for said viewer to interact therewith using one of touch and a pointing device, wherein said challenge is presented at random times during and/or after play of said multimedia content and presented at random physical locations on said multimedia content.

22. The computer implemented system of claim 19, wherein said challenge-response module presents one or more challenges at one or more times during and/or after said multimedia content is played.

23. The computer implemented system of claim 19, wherein said client device further comprises a timer for ensuring that said viewer provides said response to said challenge within a predetermined period of time after said challenge is presented.

24. The computer implemented system of claim 23, wherein said timer counts an interrupt time period for interrupting said playing of said multimedia content and presenting said challenge, wherein said interrupt time period is less than duration of said multimedia content.

25. A computer program product comprising computer executable instructions embodied in a non-transitory computer-readable medium, wherein said computer program product comprises:
a first computer parsable program code for receiving multimedia content from a server and playing said multimedia content on a display screen of a client device;
a second computer parsable program code for determining presence of a random challenge generator on said client device, and based on said determination:
generating a random challenge in said client device upon presence of said random challenge generator in said client device; and
receiving a random challenge from said server upon absence of said random challenge generator in said client device, wherein said server is capable of generating an infinite number of random challenges;
a third computer parsable program code for displaying said challenge as an overlay on said multimedia content, and wherein said random challenge is:
random in content, wherein content of each random challenge is new with respect to the content of any other random challenge presented on said client device;
unrelated to said multimedia content
presented at random times during and/or after play of said multimedia content; and
presented at random physical locations on said multimedia content;
a fourth computer parsable program code for receiving a response for said presented challenge,
wherein said response received by said viewer is determined to be one of a correct response and an incorrect response;
a fifth computer parsable program code for generating a response report based on said determination of one of a correct response and an incorrect response.

* * * * *